July 7, 1964 A. G. LECIEJEWSKI 3,139,666
METHODS OF MAKING BEARING DEVICES
Filed Feb. 2, 1962 2 Sheets-Sheet 1

INVENTOR
ANTHONY G. LECIEJEWSKI
BY
ATTORNEYS

July 7, 1964    A. G. LECIEJEWSKI    3,139,666
METHODS OF MAKING BEARING DEVICES
Filed Feb. 2, 1962    2 Sheets-Sheet 2

INVENTOR
ANTHONY G. LECIEJEWSKI
BY
ATTORNEYS

United States Patent Office 3,139,666
Patented July 7, 1964

3,139,666
METHODS OF MAKING BEARING DEVICES
Anthony G. Leciejewski, Cleveland, Ohio, assignor to Freeway Washer & Stamping Company
Filed Feb. 2, 1962, Ser. No. 170,708
9 Claims. (Cl. 29—148.4)

My invention relates to methods of making ball bearing devices.

This application is a continuation-in-part of my application Serial No. 100,694 filed in the United States Patent Office on April 4, 1961, by Anthony G. Leciejewski, now abandoned.

An object of my invention is to provide an advantageous and economical method of making a ball bearing device.

Another object is to provide a new method of fabricating and assembling ball bearing devices.

Another object is to provide practical and unprecedented methods of making ball bearing devices of the construction herein described.

Other objects and a fuller understanding of this invention may be had by referring to the following description and claims, taken in conjunction with the accompanying drawings, in which:

Figure 1:
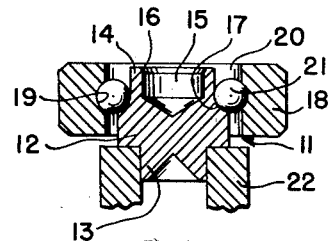
FIGURE 1 is a cross-sectional view of a preferred form of my improved bearing device in an early stage of its fabrication and assembly.

My improved bearing device in its preferred form has an outer race member 18 of metal or of other suitable material. It is a non-split race member, that is, it is integral as one piece completely around the circumference of the race member and thus provides a continuous or non-broken raceway surface. A cylindrical bore extends through the outer race member 18 from end to end, and in the wall of this bore intermediate the ends there is an annular groove 19 adapted to provide the outer surface of a raceway.

An inner race member 11 is provided with a central body portion 12 which is round and of somewhat smaller diameter than the bore in the outer race member 18, as seen in the drawing. Extending from one end of the central body portion 12 (from the lower end as seen in FIGURES 1 to 4) is a center boss or extension 13 which has a conical recess extending therein and axially disposed.

The inner race member 11 has formed thereon an annular shoulder 17 which is spaced radially inward from the groove 19 in the outer race member 18. Engaging this shoulder 17 and also engaging the inner wall of the groove 19 are a plurality of bearing balls 21 arranged in a circle as shown between the inner and outer race members.

The balls 21 are retained against axial displacement from the shoulder 17 and groove 19 and hence in the raceway between the inner and outer race members by an annular lip or wall portion 14 extending axially and radially outward in a curve from the central body portion 12. The lip or wall portion 14 surrounds a recess 15 centrally located in the inner race member at the end of boss 13. This lip or wall portion has an outer surface which complements the portion of the cross-sectional shape of the balls 21 contacted. In other words, the radius of this outer surface of the lip or wall surface 14 is substantially the same as the radius of the individual balls. The lip or wall portion 14 is curved radially outward sufficiently to provide a confining raceway for the balls 21 without appreciable looseness except in planetary movement but without binding or tightly engaging the balls and hence not preventing their free rotation in their raceway path. The annular lip or wall portion 14 and shoulder 17, in effect provide an annular groove in the inner race member 11 which with opposed groove 19 provides a raceway for balls 21.

Figure 3:
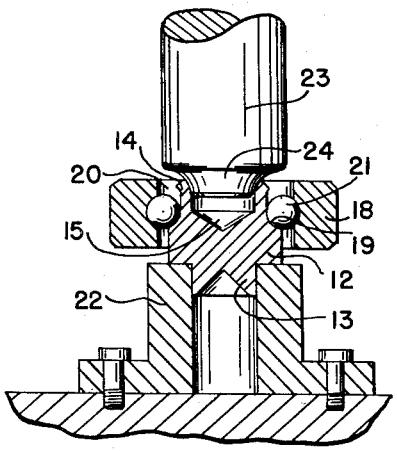
FIGURE 3 is a view like that of FIGURE 1 after the punch has been partially lowered to its ultimate position and the bearing device has been partially formed by the punch.
Figure 4:
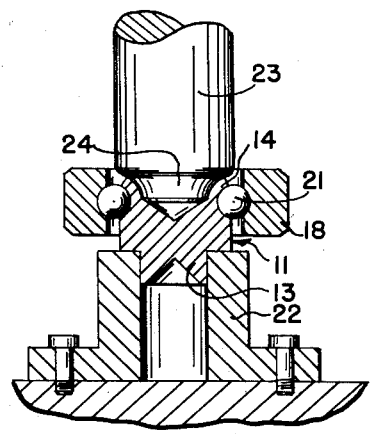
FIGURE 4 is a view like that of FIGURE 1 after the punch has been moved down to its ultimate position to complete its forming operation.
Figure 5:
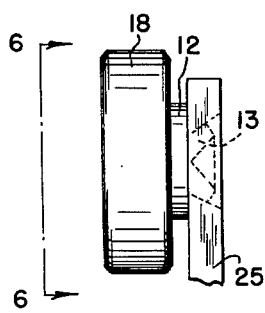
FIGURE 5 is a view of the completed bearing device secured to a mounting element.

As seen in FIGURE 5, the boss 13 is secured to a mounting element 25, for example a metal plate used in the roller support construction for drawers such as file cabinet drawers. The boss 13 is positioned in an opening in the plate 25 and the metal of boss 13 surrounding the recess therein is peened over to tightly engage the chamfered walls of the opening in plate 25, as seen in FIGURE 3.

To fabricate and assemble my improved bearing device, the balls are, by a suitable fixture, first positioned in the groove 19 of an outer race member 18. Then an inner race member 11, having the initial form illustrated in FIGURE 1, is inserted into the bore of the outer race member 18 from the lower end of the race member 18. In this position, the balls 21 are in the groove 19 and engage the shoulder 17.

In this initial form of the inner race member 11, the lip or wall portion 14 extends axially upward as shown to form a cylindrical wall around the recess 15. The inner annular edge 16 of the end of the lip or wall portion 14 is chamfered as shown in FIGURE 1. The annular space between the inner and outer races is designated by the reference character 20.

The assembly is then mounted on a support member 22 which has a cylindrical hollow upper end formed to completely receive boss 13 and to engage the central portion 12. The support 22, engaging the central portion 13, directly supports the inner race 11, and through the balls 21 indirectly supports the outer race 18.

After the parts are in the position shown in FIGURE 1, a punch 25 carried by a press or other power machine is positioned over the assembly in axial alignment therewith. The punch 23 has a nose portion 24 which has side walls extending therearound which are disposed in a concave radial curve. The radius of this curve is substantially the same as the radius of each ball 21.

Figure 2:
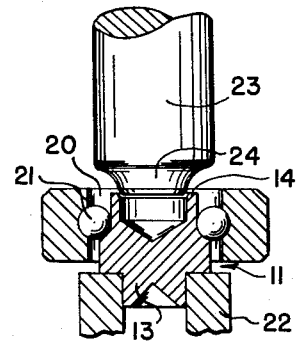
FIGURE 2 is a view like that of FIGURE 1 and showing the parts after a punch has been positioned over the parts in axial alignment therewith.

Next, the punch 23 is brought downwardly by force from the position of FIGURE 2 to the position of FIGURE 3. By reason of the chamfered edge 16, the nose portion 24 readily enters the recess 15 and forces the lip or wall portion 14 radially outwardly in a curve. Downward forced movement of the punch 23 is continued until nose portion 24 has forceably moved or spread the metal of lip or wall portion 14 outwardly to the position shown in FIGURE 1. In this formed condition of lip or wall portion 14, the open space 20 between the inner and outer race members is sufficiently closed to prevent the balls from axial displacement therein and to properly confine the balls.

By carefully controlling the extent of the downward movement of the punch 23 relative to the position of the support 22, the lip or wall portion 14 is brought over and radially expanded just sufficiently to confine the balls 21 in a smooth groove formed by shoulder 17 and the bent over lip or wall 14 but not enough to force any metal between the balls 21 and not to the point of binding or gripping the balls.

It is important that there be no breaks or cracks in the lip or wall portion 14 after it is peened or spread outwardly as described, and therefore the metal of the inner race member 11 should be of a sufficient ductile or malleable character as to permit the required forming as described by the punch without splitting or cracking. There are a number of metals, including alloys steels, readily available and known to those skilled in the art which are appropriate. After the bearing device is formed, it may be case hardened or treated as desired.

Figure 6:
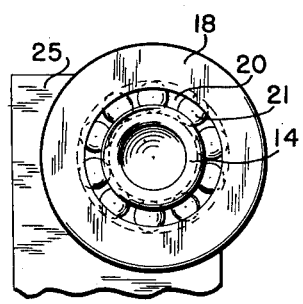
FIGURE 6 is a plan view of the assembled bearing device looking in the direction of the arrows 6—6 of FIGURE 5.

After the inner and outer race members with balls are assembled, as described in connection with FIGURES 1 to 4, then the assembly may be mounted to a plate 25 or other suitable mounting element, as described in connection with FIGURES 5 and 6.

Figure 7:
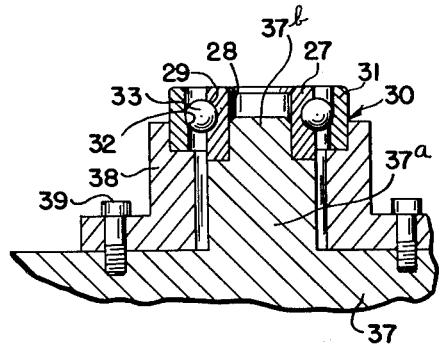
FIGURE 7 is a cross-sectional view of a modified form of our bearing device made by a modification of the first described method and shows an early stage of fabrication and assembly.
Figure 8:
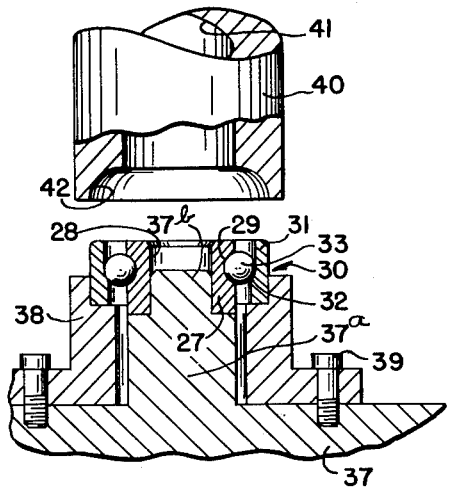
FIGURE 8 is a view like that of FIGURE 7 and showing the parts after a modified punch has been positioned over the parts in axial alignment therewith.

A modified form of bearing device made by a modified method is illustrated in FIGURES 7 to 10, inclusive. In this modified form, the inner race member 27 has an annular groove 29 formed in its outer cylindrically-shaped wall. The outer race member 30 is dimensioned to concentrically receive the inner race member 27 therein as illustrated. The outer race member 30 has an annular shoulder 32 formed therein at a distance from the upper end of the bearing device with the parts disposed as illustrated in FIGURES 7 and 8. In its initial form, the outer race member 30, from the shoulder 32 and extending upwardly therefrom, has an annular lip portion 31 which is of less radial thickness than is the race member 30 below the shoulder 32. In other words, the annular space between the inner and outer race members is greater above the shoulder 32 than it is below the shoulder 32.

To assemble and form the modified form of bearing device, the outer race member 30 is positioned upon an annular support 38 which, in turn, is supported upon a base plate 37 in such manner that the shoulder 32 is facing upwardly and the outer race member 30 is firmly supported with its axis in a vertical direction upon the support 38. Thereafter balls 33 are assembled on the inner race member 27 so as to be disposed in the annular groove 29 prior to the introduction of the inner race member 27 within the outer race member 30. The assembly of inner race member 27 and plurality of balls 33 is then lowered downwardly along the axis of the outer race member 30 to the position illustrated in FIGURE 7 and where the plurality of balls 33 rest upon and engage the annular shoulder 32. By reason of the dimensions of the parts, the balls 33 may move axially downwardly within the outer race member 30 to the location of the shoulder 32 but may not go below the level of the shoulder 32.

When in this lower position illustrated in FIGURE 7, the inner race member 27 is supported on a central portion 37a projecting upwardly from the base plate 37. A boss or projection 37b extending upwardly from the central portion 37a is disposed within a bore 28 of the inner race member 27 so as to centrally locate the inner race member 27 concentrically within the outer race member 30. The described supports firmly hold the parts in the fixed elevation illustrated in FIGURE 7. Bolts 39 firmly hold the support 38 in fixed position on the base plate 37.

The outer race members and particularly the outer race member 30, are made of a suitable bendable metal to adapt itself to the forming operation herein described.

After the parts are assembled and positioned as shown in FIGURE 7, then a punch 40 is positioned over the assembly of race members and balls as illustrated in FIGURE 8. This punch 40 has a bore 41 and extending from the lower end of the punch 40 to the bore 41 there is a cupped or dished recess 42 having inner curved walls of annular form as illustrated.

By a hydraulic press or other mechanical force, the punch 40 is forceably brought downwardly toward the base plate 37 so that the upper outer corner of the lip portion 31 of the outer race member 30 is engaged by the curved sloping inner wall of the recess 42. Further downward movement of the punch 40 tends to force the lip portion 31 radially inward by a camming or squeezing action and the outer race member 30 is thereby bent to the form illustrated in FIGURE 9. As seen, the lip portion 42 has been bent so as to overlie the plurality of balls and to form in cooperation with the shoulder 32 an annular groove in the inner wall of the outer race member 30. By reason of the exact and precise location of the supporting base plate 37 and the exact and precise movement of the punch 40, the lip portion 31 is formed radially inward only a sufficient amount to form the annular groove required for the balls 33 but without pressing upon the balls 33 so as to lock them against free rotation. The exactness of the dimensions and movements assure that the metal of the lip portion 31 does not flow downwardly between the individual balls 33 but rather forms a smooth, even annular wall in the groove formed by the shoulder 32 and the inwardly turned or formed lip portion 31, resulting from the bending by the punch 40. The opposed groove 29 in the inner race member 27 and the groove formed by the shoulder 32 and by the compressed or formed-over lip portion 31, together form an annular raceway for the plurality of balls 33 arranged in a circle between the inner and outer race members.

Figure 9:
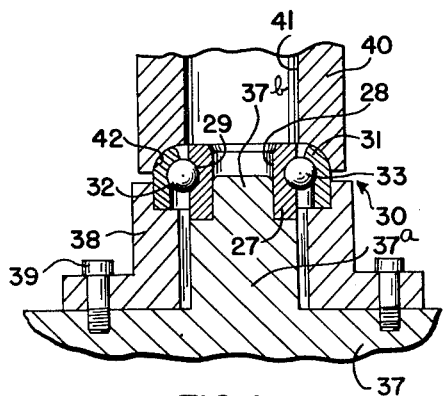
FIGURE 9 is a view like that of FIGURE 7 after the punch has been moved down to its ultimate position to complete its forming operation.

After the bending has been completed, as shown in FIGURE 9, then the punch 40 is raised and the assembly of inner and outer race members with the balls therebetween is removed from the support given by the supporting portions 38 and 37a. The assembly is then ready for use in a roller or other structure.

Figure 10:
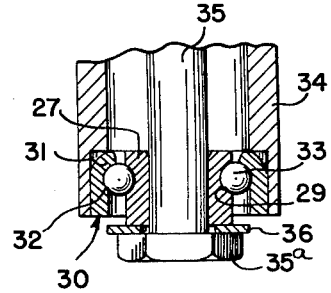
FIGURE 10 is a view illustrating a completed bearing device in the described modified form mounted to a mounting element and inserted in a shell or roller.

In FIGURE 10, there is illustrated a mounting of the modified form of our bearing device in a cylindrical roller 34 which may be of the usual type of which a plurality are mounted to a long frame to make a roller type conveyor, such as those used for rolling containers by gravity down a grade between spaced locations. The end of the cylindrical roller 34 is recessed to receive the bearing device assembly, the recess being dimensioned to snugly receive in a press fit the outer race member 30 so that the assembly is substantially contained within the recess formed within the roller 34. An inner shoulder at the bottom of the recess provides an abutment for the inner end of the race member 30 so as to prevent the assembly from going inwardly beyond the position illustrated in FIGURE 10. A shaft such as a bolt 35 is positioned axially within the bore in the inner race member 27. The bolt 35 is adapted to be secured to a supporting member, not shown, in such manner that the cylindrical roller 34 may freely revolve around the shaft or bolt 35. A head 35a of the bolt 35 engages a washer 36 which, in turn, abuts the outer end of the inner race member 27 so that the bolt 35 is secured to the inner race member 27. The typical assembly of parts illustrated in FIGURE 10 shows an advantageous use of the bearing device made as described.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. The method of making a bearing member which comprises providing a plurality of balls, providing an outer race member having a bore therein with an inner groove formed therein for accommodating said balls, providing an inner race member of bendable metal, forming an annular shoulder around the outer wall of said inner race member, forming a central recess extending partially through said inner race member along its axis toward, but spaced from, a first end of the inner race, to provide an annular wall at the opposite end of the inner race member around said recess, inserting said balls arranged in a circle between said race members and concentric therewith to position the balls on said shoulder and in said annular groove of the outer race member, supporting said inner race member, and by means of a bending punch having the same curvature as said balls bending only said annular wall radially outward to bend the same in a gradual curve complementing the curvature of said balls and overlapping said balls to retain them between the inner and outer race members against axial displacement, said bending being sufficient to confine said balls by such complementarily curved wall without binding the balls so as to permit their movement between the race members and without expanding the inner race member at said shoulder.

2. The method of making a bearing member comprising providing a plurality of balls, providing an outer race member having a groove formed in the wall of the bore therein, providing an inner race member of formable metal, forming a shoulder therearound, forming an annular bendable wall extending axially of an end of said inner race member, placing said balls arranged in a circle between said race members to rest on said shoulder and disposed radially outward of said annular bendable wall, supporting said inner race member, extending a punch with a bending nose having the same curvature as said balls on a side thereof downwardly on said supported inner race member to bend said annular bendable wall outwardly in a curve complementing the curvature of said balls to overlap said balls, without binding the balls, to lock the balls between said race members for movement in the raceway provided by said groove, said shoulder and said formed wall and without expanding the inner race member at said shoulder.

3. The method as defined in claim 2 and in which the nose of the punch has an outer forwardly directed wall extending therearound and relieved in a curve complementing the curvature of said balls on a side thereof.

4. The method in the making of a bearing member of locking balls in position between inner and outer metal race members, the inner race having a bendable metal portion concentric therewith and at an axial end thereof, comprising placing the balls between the race members in a groove in the outer race member and supported on a shoulder on the inner member, and, by a bending punch having a forward nose having therearound a recessed curved wall facing outwardly and complementing the curvature of said balls brought against said bendable portion of the inner race, bending said metal bendable portion of the inner race member radially outward at an axial distance from said shoulder and around the circumferential extent of the inner race member to complementarily overlie the balls without frictionally seizing the balls and to hold the same against axial displacement between said race members and without expanding the inner race member at said shoulder.

5. The method of making a bearing member which comprises providing a plurality of balls, providing an inner race member having an external annular groove formed in the outer wall thereof for accommodating said balls, providing an outer race member of formable metal having a bore to receive the inner race member, forming an annular shoulder around the inner wall of said outer race member, forming a bendable annular wall portion of uniform radial thickness on said outer race member extending from said shoulder to an end of the outer race member, inserting said balls arranged in a circle between said race members and concentric therewith to position the balls on said shoulder and in said external annular groove of the inner race member, supporting said outer race member, and, by a bending punch having a forward cupped end having therearound a recessed curved wall facing inwardly and complementing the curvature of said balls brought against said bendable annular wall portion of the outer race, bending said annular wall portion only radially inward to form the same in a gradual curve complementarily overlapping said balls to retain them between the inner and outer race members against axial displacement, said bending being sufficient to confine said balls without binding the same so as to permit their movement between the race members and without contracting said outer race member at said shoulder.

6. The method of making a bearing member comprising the providing of a plurality of balls, providing an inner race member having an annular groove formed in the outer wall thereof, providing an outer race member of bendable metal having a central opening therein for receiving said inner race member, forming an annular shoulder on the wall of said central opening at a distance from a first end of the outer race member to provide an annular bendable wall portion extending from said shoulder to said first end of the outer race member, placing said balls arranged in a circle between said race members to rest on said shoulder and disposed radially inward of said annular bendable wall, supporting said outer race member against axially directed downward force, extending a punch having a concave end portion downwardly on said supported outer race member to press and form said annular bendable wall only inwardly in a curve complementing the curvature of said balls to overlap said balls, without binding said balls, to lock the balls between said race members for movement in the raceway provided by said groove, said shoulder and said bent wall, and without contracting the outer race member at said shoulder.

7. The method as defined in claim 6 and in which the concave end portion of the punch has a cupped wall complementing the curvature of said balls.

8. The method in the making of a bearing member of locking balls in position between inner and outer metal race members, comprising placing the balls in a circle arrangement between the race members in an annular groove in the outer wall of the inner race member and supported on an annular shoulder on the inner wall of the outer race member, and, by means of a bending punch having a concave end with inner walls complementing the curvature of said balls, bending the metal of the outer race member radially inward at an axial distance only from said shoulder and around the circumferential extent of the outer race member to complementarily overlie the balls without frictionally seizing the balls and to hold the same against axial displacement between said race members, without contracting the outer race member at said shoulder.

9. The method in the making of a bearing member of locking balls in position between inner and outer race members of bendable metal, comprising placing the balls between the race members in a circle arrangement between the race members in an annular groove formed in one of said race members and supported on an annular shoulder on the other of said race members, and, by means of a bending punch having the same curvature as said balls, bending the metal of said other of the race members radially toward the said one race member and toward the centers of said balls at an axial distance only from said shoulder and around the circumferential extent of the said other of the race members to complementarily overlie the balls without frictionally seizing the balls and to hold the same against axial displacement between said race members, and without contracting the said other of the race members at said shoulder.

References Cited in the file of this patent

UNITED STATES PATENTS

| | | |
|---|---|---|
| 872,168 | Clark | Nov. 26, 1907 |
| 1,080,169 | Reed | Dec. 3, 1913 |
| 1,173,793 | George | Feb. 29, 1916 |
| 2,316,449 | Parker | Apr. 13, 1943 |
| 2,370,173 | Kendall | Feb. 27, 1945 |
| 2,629,165 | Stillwagon | Feb. 24, 1953 |
| 2,719,765 | Menne | Oct. 4, 1955 |
| 2,792,619 | Komm | May 21, 1957 |
| 2,910,765 | Heim | Nov. 3, 1959 |
| 2,913,810 | Heim | Nov. 24, 1959 |
| 2,998,636 | Spence | Sept. 5, 1961 |
| 3,013,327 | Spence et al. | Dec. 19, 1961 |

FOREIGN PATENTS

| | | |
|---|---|---|
| 502,554 | Belgium | Oct. 30, 1951 |